3,247,135
LIGNIN REINFORCED RUBBER AND METHOD
OF PREPARATION THEREOF
Joseph B. Doughty, Charleston, S.C., assignor to West
Virginia Pulp and Paper Company, New York, N.Y., a
corporation of Delaware
No Drawing. Filed Feb. 10, 1961, Ser. No. 88,292
9 Claims. (Cl. 260—17.5)

This invention relates to methods of preparing lignin reinforced rubber and to the reinforced rubber obtained thereby.

In U.S. Patent No. 2,608,537 to Pollak, a method of incorporating lignin into rubber by joint precipitation of a mixture of a rubber latex and an aqueous alkali lignin solution was disclosed. By the employment of this coprecipitation process a lignin reinforced rubber can be obtained which possesses a very high order of properties and which for many purposes is equal or superior to rubbers reinforced with carbon black. It has generally been found desirable, however, that for use in vehicle tires that the abrasion resistance, modulus, hardness and heat build up or hysteresis of the lignin reinforced rubber be improved. A very successful method of improving these properties is disclosed in British Patent No. 781,019, wherein the lignin-rubber coprecipitate after drying is subjected to heat treatment process at temperatures above 300° F. This heat treatment of the dry coprecipitate can be carried out either dynamically or statically although the former method is much preferred and can easily be accomplished in the well-known Banbury mixer. Unfortunately ordinary alkali lignin as precipitated from black liquor cannot be employed in such a process. Typical recovered kraft pine lignins have fusion temperatures in the range of 350 to 410° F. but tend to coalesce in a rubber system at much lower temperatures, on the order of 250 to 300° F. Heating of a lignin-rubber system above the temperatures at which the lignin coalesces causes the minutely precipitated lignin particles to fuse or gel resulting in reduced reinforcement and a serious decrease in the properties of the finished cured rubber. Other alkali lignins, such a kraft hardwood lignin, and soda pine and hardwood lignins tend to fuse at even lower temperatures than kraft pine lignin and consequently are much more subject to the detrimental effects of coalescing upon heating. For any heat treatment process to be of benefit a lignin must be employed which has greater resistance to heat than that of normally recovered lignins.

It has recently been discovered that heating the slurry of lignin-rubber particles obtained upon coprecipitation greatly improves the physical characteristics of the coprecipitate in regard to filterability, cohesiveness, drying rate and solids content. The lignin in this process is subjected to heating to temperatures above about 175° F. while in the aqueous medium. In an aqueous medium, kraft pine lignins fuse at temperatures below 175° F. Since fusion of the lignin results in degradation of the properties of the cured rubber, it is extremely desirable that lignin of greater heat resistance than that of normal kraft pine lignin be employed.

It is therefore the primary object of this invention to provide a method for increasing the heat resistance of lignin in a lignin-rubber coprecipitate. Other objects will appear in the following description of this invention:

I have found that by combining the lignin to be employed in the coprecipitation process with a phenolic resin resole that a lignin-rubber coprecipitate can be prepared in which the lignin is more resistant to the effects of heat. Thus a lignin-rubber coprecipitate slurry can be heated to the range of 180–200° F., or even in some cases to higher temperatures, without causing serious fusion of the lignin, and the dry lignin-rubber can be heated to temperatures well in excess of 300° F., such as in a Banbury, without degrading the reinforcing properties of the lignin in the rubber. It has also been found that beneficial improvements in the properties of the cured lignin reinforced rubber can be obtained by combining the lignin with a resole whether or not the lignin-rubber system is subjected to heat. Primary among the improvements in the rubber is a notable increase obtainable in the modulus (stress at 300% strain).

In carrying out the present invention a joint solution of a phenolic resin resole and lignin is first prepared. This resin-lignin solution is in turn mixed with latex and the lignin-latex-resin mixture precipitated in a normal manner with acidic materials. In most rubbers, depending upon the properties desired in the final product, the lignin loading will generally range between about 25 and 100, i.e., 25 to 100 parts by weight of lignin will be employed to reinforce 100 parts by weight of rubber solids. Thus the lignin-latex mixture should be prepared so as to contain between 25 and 100 parts of lignin to 100 parts of rubber solids. One notable exception to this is when highly extended oil extended rubbers are employed. The lignin loading with these rubbers may be as high as 150.

The lignin-and-resole evidently react quite readily under the acidic conditions of coprecipitation to greatly improve the heat resistance of the lignin. The degree of heat resistance imparted to the lignin by this method can be varied somewhat by the amount of resin which is employed. The greater the quantity of resole employed, the greater in general will be the increase in the heat resistance of the lignin. Quantities of resole as small as 0.1% by weight of the weight of the lignin have been found to provide beneficial increases in the heat resistance of the lignin; however, preferably the resole should be employed in an amount equal to about 0.5 to 2% by weight of the weight of the lignin. While greater amounts of resin can be employed it does not appear that the benefits which are derived are commensurate with the additional cost involved.

The resoles employed in this invention are methylol phenol compounds prepared by condensing an aldehyde with a phenolic material in the presence of an alkaline catalyst. A wide variety of resoles possessing somewhat different characteristics can be prepared dependent upon the aldehyde, phenol, catalyst, ratio of reactants, and cooking conditions employed in the condensation. The aldehyde commonly employed is formaldehyde but other aldehydes such as acetaldehyde, furfural, and benzaldehyde are often employed. Likewise phenol is generally used although many other phenolic compounds such as resorcinol, cresols, or xylenols are also used to a great extent. The catalysts commonly employed are the alkali metal hydroxides, ammonia, or heavy metal hydroxides such as barium hydroxide. The resole regardless of the conditions and reactants employed are A stage thermoplastic resins which are soluble in water or in aqueous alkaline solutions. Advancement of the resole will convert the resin successively to the B state (resistol), where the resin loses its water solubility and thermoplasticity, and finally to the C state (resite) where it becomes wholly insoluble and infusible. Both water and aqueous alkali solutions of the resole are completely compatible with solutions of the alkali metal salt of lignin, and joint solutions of the two materials may easily and simply be prepared by simple admixture of the two solutions either before or after the mixing of the lignin with the rubber latex.

Instead of adding the resole lignin solution directly to the latex and then effecting coprecipitation, it is possible to precipitate the lignin with the resole alone and to obtain the improved reinforcing agent in dry form by filtering and drying. For incorporating the resole reacted lignin into the rubber, it may be redissolved in an aqueous alkaline solution to which latex may be added and the lignin coprecipitated with the latex. While this method suffers from several obvious disadvantages, it does permit preparation of the reacted lignin at sites removed from the area in which the rubber processing is carried out.

and sheeted out. During milling the following vulcanizing agents were added:

|   | Grams |
|---|---|
| N-cyclohexylbenzothiazol-2-sulfenamide | 7.5 |
| DPG (diphenyl guanidine) | 2.5 |
| N-isopropyl-N'-phenyl-p-phenylene diamine | 5.0 |
| Sulfur | 9.0 |

The rubber was then cured at 287° F., for 30, 40, 60, and 75 minutes. The properties of the cured rubber were determined to be as follows:

| Cure, Min. | Modulus, p.s.i. | Tensile, p.s.i. | Elong., percent | Shore A hardness | Crescent tear, lbs./in. | NBS abrasion index | DeMattia flex. growth (increase in crack width in inches per 200,000 cycles) |
|---|---|---|---|---|---|---|---|
| 30 | 210 | 1,510 | 800 | 57 | 320 |  |  |
| 40 | 430 | 2,470 | 740 | 60 | 395 | 214 | 0.413 |
| 60 | 750 | 3,350 | 730 | 63 | 420 | 232 | 0.447 |
| 75 | 1,020 | 3,390 | 630 | 65 | 440 |  |  |

Although the use of phenolic resoles with the lignin has proved to be particularly advantageous in use with natural and butadiene styrene rubbers in order to improve the reinforcing effect of the lignin for vehicle tire use, the resole may also be employed with lignin in any of the other butadiene type rubbers, namely chlorobutadiene and acrylonitrile rubbers, to some advantage. It is somewhat surprising that the resole can be employed in the butadiene styrene rubbers since phenolic resins have heretofore been felt to be incompatible with them due to their tendency to cure the rubber as soon as they are milled in. In use with lignin, according to the practice of this invention, the phenolic resins are readily compatible with the butadiene styrene rubbers.

The following examples illustrate several specific methods of practicing the present invention.

*Example 1*

25 pounds of moist kraft pine sodium lignate (equivalent to 17.1 pounds of precipitatable lignin) were dissolved in 16 gallons of water at 185° F. To this solution were added 350 grams of a low advanced soda catalyzed phenolic resin solution dissolved in one liter of water. (This resole was prepared by reacting one mole phenol with approximately 2 moles of formaldehyde.) The resin solution contained 193 grams or 0.425 pound of resin solids. The lignin-resin mixture was mixed with rubber latex and coprecipitated by adding it to 30 gallons of acid water at 180° F. containing 1600 ml. of 78% sulfuric acid. The temperature of the resultant slurry was raised from about 150° F. to 180° F. by direct injection of steam into the slurry. The slurry was then filtered, washed, and dewatered under a pressure of about 12 p.s.i. on a rotary vacuum filter to yield a filter cake having a solids content of 52.7%. The filter cake was dried overnight in an oven at 200° F.

750 grams of the dried coprecipitate were masticated in a Model B Banbury for 2.5 minutes when the following materials were added:

|   | Grams |
|---|---|
| Coal tar plasticizer | 50 |
| Stearic acid | 10 |
| Zinc oxide | 25 |
| Phenyl-beta-naphthylamine antioxidant | 5 |

Mastication of the stock was continued for an additional 2.5 minutes after the addition of the above ingredients before the stock was dumped. The temperature of the stock when dumped was 398° F.

The Banbury stock was milled at 180° F. for 20 minutes

Another portion of the dried coprecipitate was employed for preparing a half tire tread for comparison with a half tread of a standard first line carbon black rubber. The lignin coprecipitate was processed according to the above conditions except that curing conditions were modified so as to obtain optimum cure of the carbon black rubber. Curing was accomplished at 287° F. for 50 minutes. Road tests were conducted on the composite tire with the following results.

| Miles | Wear, miles per 0.001 in. | | Abrasion index lignin-rubber as percent of carbon black rubber |
|---|---|---|---|
|  | Carbon black | Lignin |  |
| 1,800 | 98 | 100 | 102 |
| 3,600 | 108 | 111 | 103 |
| 5,400 | 82 | 88 | 106 |
| 7,200 | 71 | 77 | 107 |

*Example 2*

1540 grams of moist kraft pine sodium lignate (equivalent to 1200 grams of precipitatable lignin) were dissolved in 7000 ml. of water at 180° F. 47 grams of trimethylol phenol were added to the lignin solution. 10,850 ml. of a butadiene styrene latex containing 2400 grams of rubber solids were then mixed with the lignin-resin solution and the mixture heated to 150° F. Coprecipitation of the lignin, resin, and rubber was brought about by adding this mixture to 14,000 ml. of acid water at 195° F. containing 175 ml. of 78% sulfuric acid. The slurry of coprecipitated particles was filtered, washed, and dewatered using a Buchner funnel. The solids of the filter cake was 28.7%. This cake was dried overnight in an oven at about 200° F.

300 grams of the dried coprecipitate was milled at 180° F. for 10 minutes when 2 grams of stearic acid were added. Milling was continued for 5 minutes when 10 grams of coal tar plasticizer were added. After an additional 5 minutes milling, 10 grams of zinc oxide, 3 grams benzothiazyl disulfide and 0.6 gram copper dimethyl dithiocarbamate were added and milled into the rubber for 5 minutes when 5 grams of sulfur were added. After the addition of the sulfur the rubber was milled for five minutes before being sheeted out. The sheeted rubber was then cured at 287° F. for 30 and 45 minutes. The cured rubber obtained was tested with the following results.

| Cure time, min. | Modulus, p.s.i. | Tensile, p.s.i. | Elong., percent | Shore A hardness | Crescent tear, lbs./in. |
|---|---|---|---|---|---|
| 30 | 840 | 3,410 | 690 | 88 | 520 |
| 45 | 910 | 3,490 | 670 | 90 | 470 |

*Example 3*

465 grams of moist kraft pine sodium lignate (equivalent to 400 grams precipitatable lignin) were dissolved in 1800 grams of water. To this solution was added 15.7 grams of a phenolic resin resole dissolved in 250 ml. of water. This resole was a soda catalyzed resin prepared by reacting phenol with paraformaldehyde. In the preparation of the resin, one mole of phenol was reacted with approximately 1.2 moles of formaldehyde. The resultant lignin-resin solution was mixed with 4200 ml. of a butadiene styrene latex containing 800 grams of rubber solids which had been diluted with 4000 ml. of water. The lignin-resin-latex mixture was coprecipitated by adding it to 4000 ml. of acid water at 180° F. containing 60 ml. of 78% sulfuric acid. The slurry of coprecipitated particles was heated to 180° F. and then filtered, washed and dewatered. The solids content of the dewatered cake was 52.4%. This cake was dried overnight in an oven at 200° F.

750 grams of the dried coprecipitate were masticated in the Banbury, milled and cured according to the procedures set forth in Example 1. The physical properties of the cured rubber were determined to be as follows:

| Cure time, min. | Modulus, p.s.i. | Tensile, p.s.i. | Elong., percent | Shore A hardness | Crescent tear, lbs./in. | DeMattia flex. growth 1,000 cycles to 0.5 inch |
|---|---|---|---|---|---|---|
| 30 | 700 | 2,670 | 630 | 61 | 265 | |
| 40 | 1,000 | 2,700 | 560 | 63 | 245 | 115 |
| 60 | 1,040 | 2,730 | 530 | 65 | 320 | |
| 75 | 1,280 | 2,820 | 510 | 65 | 345 | |

*Example 4*

For comparative purposes a run was made under the conditions of Example 3 with the exception that no phenolic resin was employed. In this run 978 grams of moist kraft pine sodium lignate (equivalent to 800 grams of precipitatable lignin) were dissolved in 6000 grams of water at 200° F. This lignin solution was mixed with 8200 grams of butadiene styrene latex containing 1600 grams of rubber solids. The lignin and rubber were coprecipitated by adding the mixture thereof to 1000 ml. of water at 195° F. containing 125 ml. of concentrated (78%) sulfuric acid. The coprecipitate was washed, filtered, and dried. Two 750 gram portions of the dried cake were compounded and cured as in Example 1 with the exception that one portion was Banburied at 313° F. and the other portion at 394° F. Tests of the cured rubber yielded the following optimum results.

| Banbury temp. | Cure time, min. | Modulus, p.s.i. | Tensile, p.s.i. | Elong., percent | Shore A hardness | Crescent tear, lbs./in. | DeMattia flex. growth 1,000 cycles to 0.5 inch | NBS abrasion index |
|---|---|---|---|---|---|---|---|---|
| 313 | 100 | 390 | 1,890 | 820 | 63 | 150 | 142 | 66 |
| 394 | 40 | 900 | 1,490 |  | 63 | 165 | 34 | 107 |

It will readily be observed from the above results that very poor properties were obtained upon subjecting the unmodified lignin without phenolic resin to a high temperature heat treatment in the Banbury. Electron photomicrographs of these rubbers clearly indicated that fusion of the lignin had occurred and was responsible for the low order of properties obtained. These poor results may be contrasted to the good results shown in Examples 1 and 3 wherein phenolic resin was employed.

The phenolic resins also may be employed with heat resistant lignins, such as highly oxidized lignin, to some advantage. The primary benefit obtained in such a case is a substantial increase in the modulus of the cured rubber.

*Example 5*

Utilizing the procedures of Example 2, a fifty-loading lignin reinforced rubber was prepared utilizing a lignin which had been oxidized by blowing air through a sodium lignate solution at a pH of about 10–11, at a temperature of about 160° F. for 24 hours. The phenolic resin was used at a level equal to 5% of the weight of the lignin. A second rubber sample was also prepared utilizing the same oxidized lignin but with no phenolic resin. The tests results of the two rubber samples were as follows:

| Resin content percent of lignin by weight | Modulus, p.s.i. | Tensile, p.s.i. | Crescent tear, lbs./in. |
|---|---|---|---|
| 0 | 775 | 3,370 | 475 |
| 5 | 1,090 | 3,360 | 530 |

*Example 6*

A series of lignin reinforced rubber samples were prepared according to the procedure shown in Example 2 except that an oxidized lignin was employed and varied quantities of the trimethylol phenol were employed with the lignin. The resin level was varied from 0 to 15% by weight of the weight of lignin with the following results being obtained:

| Resin content percent of lignin by weight | Modulus, p.s.i. | Tensile, p.s.i. | Crescent tear, lbs./in. |
|---|---|---|---|
| 0 | 690 | 3,270 | 400 |
| 1 | 1,090 | 3,090 | 390 |
| 2 | 1,110 | 3,290 | 410 |
| 4 | 1,040 | 3,510 | 470 |
| 10 | 1,010 | 3,390 | 500 |
| 15 | 1,150 | 3,110 | 470 |

It will be observed from this series that the optimum level of usage of resin is at a very low level, i.e., about 1% of the weight of the lignin. The use of higher quantities of resin has very little if any effect on the properties of the rubber, although the initial 1% of resin increased the modulus by over 55%.

While this invention has been illustrated in connection with several specific examples, it is to be understood that the practice of this invention may be varied widely within the scope of the principles set forth hereinabove and of the appending claims.

I claim:

1. The method of preparing a lignin having improved reinforcing characteristics in a butadiene rubber which comprises coprecipitating lignin and an alkaline catalyzed phenol-aldehyde resole from an aqueous alkaline solution of said lignin and said resole by the acidification of said alkaline solution.

2. The method of making a lignin reinforced rubber which comprises coprecipitating lignin, rubber, and alkaline catalyzed phenol-aldehyde resole from a mixture of a butadiene rubber latex and an aqueous alkaline solution of lignin and phenolic resin resole, separating the coprecipitate thus obtained from the supernatant liquid and drying the coprecipitate.

3. The method which comprises coprecipitating lignin, rubber, and alkaline catalyzed phenol-aldehyde resole from a mixture of a butadiene rubber latex and an aqueous alkaline solution of lignin and said phenol-aldehyde resole, separating the coprecipitate obtained thereby from the supernatent liquid, drying said coprecipitate until essentially free of all moisture, subjecting the dried coprecipitate to a heat treatment at a temperature above 300° F., and compounding and curing the heat treated coprecipitate.

4. A rubber reinforcing agent comprising lignin coprecipitated with an alkaline catalyzed phenol-aldehyde resole from an aqueous alkaline solution of said lignin and said resole, the quantity of said resole being between 0.1 to 15% of the weight of said lignin.

5. The reinforcing agent of claim 4 wherein the quantity of said resole is equal to between 0.5 and 2% of the weight of the lignin.

6. A rubber stock comprising 100 parts by weight of a butadiene rubber with from 25 to 150 parts by weight of the reinforcing agent of claim 4.

7. The rubber stock of claim 6 wherein the butadiene rubber is butadiene styrene.

8. The rubber stock of claim 6 wherein the quantity of resole in the reinforcing agent is equal to between 0.5 and 2% of the lignin.

9. The method of making a lignin reinforced rubber which comprises:
(A) Preparing a mixture of
 (1) a butadiene rubber latex containing 100 parts by weight of rubber solids and
 (2) an aqueous alkaline solution of lignin and alkaline catalyzed phenol-aldehyde resole, said solution containing between 25 and 150 parts by weight of lignin and phenol-aldehyde resole solids equal to between 0.5 and 2% of the weight of the lignin,
(B) Coprecipitating the lignin, resole and rubber from said mixture by the admixture therewith of an acidic material,
(C) Drying the coprecipitate thus obtained, and
(D) Compounding and curing the dried coprecipitate.

References Cited by the Examiner

UNITED STATES PATENTS

| | | | |
|---|---|---|---|
| 1,922,690 | 8/1933 | Langovoy | 260—17.5 |
| 2,156,160 | 4/1939 | Olson et al. | 260—17.5 |
| 2,845,397 | 7/1958 | Mills | 260—3 |
| 2,878,197 | 3/1959 | Baxter et al. | 260—17.5 |
| 2,890,183 | 6/1959 | Haxo et al. | 260—17.5 |
| 3,093,604 | 6/1963 | Ayers | 260—17.2 |

WILLIAM H. SHORT, *Primary Examiner.*

MILTON STERMAN, JAMES A. SEIDLECK, LOUISE P. QUAST, *Examiners.*